(12) United States Patent
Seo

(10) Patent No.: US 8,769,150 B2
(45) Date of Patent: Jul. 1, 2014

(54) CONVERTING CONTENT FOR DISPLAY ON EXTERNAL DEVICE ACCORDING TO BROWSING CONTEXT AND BASED ON CHARACTERISTIC OF EXTERNAL DEVICE

(75) Inventor: Hyung-jin Seo, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/172,318

(22) Filed: Jun. 29, 2011

(65) Prior Publication Data

US 2011/0320563 A1 Dec. 29, 2011

(30) Foreign Application Priority Data

Jun. 29, 2010 (KR) .................. 10-2010-0062075

(51) Int. Cl.
*G06F 15/16* (2006.01)

(52) U.S. Cl.
USPC .......................................................... 709/246

(58) Field of Classification Search
CPC ............. H04L 51/063; H04L 65/601
USPC ............ 709/217, 246; 707/749, 751
See application file for complete search history.

(56) References Cited

U.S. PATENT DOCUMENTS

| | | | | |
|---|---|---|---|---|
| 5,508,713 A * | 4/1996 | Okouchi | .................... | 345/2.2 |
| 6,968,539 B1 * | 11/2005 | Huang et al. | .............. | 717/115 |
| 7,467,231 B2 * | 12/2008 | Kegoya et al. | ............ | 709/246 |
| 7,580,005 B1 * | 8/2009 | Palin | .............. | 345/1.1 |
| 7,698,626 B2 | 4/2010 | Baluja et al. | | |
| 7,721,303 B2 * | 5/2010 | Alves de Moura et al. | ... | 719/328 |
| 7,834,849 B2 | 11/2010 | Hunleth et al. | | |
| 8,086,489 B2 * | 12/2011 | Ramakrishna | .......... | 705/14.4 |
| 8,181,107 B2 * | 5/2012 | Melnyk et al. | ............ | 715/238 |
| 2002/0059367 A1 * | 5/2002 | Romero et al. | .......... | 709/203 |
| 2002/0091755 A1 * | 7/2002 | Narin | .......... | 709/203 |
| 2003/0164855 A1 * | 9/2003 | Grant et al. | .............. | 345/763 |
| 2004/0027375 A1 * | 2/2004 | Ellis et al. | ................ | 345/753 |
| 2007/0083810 A1 * | 4/2007 | Scott et al. | ................ | 715/525 |
| 2009/0083289 A1 * | 3/2009 | Morris | ....................... | 707/10 |
| 2010/0174607 A1 * | 7/2010 | Henkin et al. | ......... | 705/14.53 |
| 2010/0192055 A1 * | 7/2010 | Shaked et al. | ............ | 715/234 |
| 2010/0280860 A1 * | 11/2010 | Iskold et al. | .................. | 705/7 |
| 2012/0150874 A1 * | 6/2012 | Sweeney et al. | ........... | 707/749 |

FOREIGN PATENT DOCUMENTS

| | | |
|---|---|---|
| JP | 2009-129430 | 6/2009 |
| KR | 1020060031600 | 4/2006 |
| KR | 1020070043974 | 4/2007 |
| KR | 1020090088483 | 8/2009 |

* cited by examiner

*Primary Examiner* — Lance L Barry
(74) *Attorney, Agent, or Firm* — The Farrell Law Firm, P.C.

(57) ABSTRACT

Methods and apparatuses for converting content are provided. A predetermined request signal from an external device. All or a portion of currently browsed content is converted into data that can be browsed on the external device, based on information about the external device contained in the predetermined request signal. The data is transmitted to the external device.

10 Claims, 3 Drawing Sheets

CONVERTING CONTENT FOR DISPLAY ON EXTERNAL DEVICE ACCORDING TO BROWSING CONTEXT AND BASED ON CHARACTERISTIC OF EXTERNAL DEVICE

PRIORITY

This application claims priority under 35 U.S.C. §119(a) to Korean Patent Application No. 10-2010-0062075, filed on Jun. 29, 2010, in the Korean Intellectual Property Office, the disclosure of which is incorporated herein by reference.

BACKGROUND OF THE INVENTION

1. Field of the Invention

The present invention relates generally to a method and apparatus for converting content, and more particularly, to a new user interaction interface between a browser in a Computer Equipment (CE) device and a smartphone with a wireless network connection connected thereto.

2. Description of the Related Art

In order to capture a screen that is currently displayed on a TV browser, a user may directly take a picture of the screen using the smartphone's camera. However, noise may be captured depending on the frequency at which a smartphone's sensor or TV updates, or the sensor may not easily recognize the captured data due to poor image quality. Furthermore, storing and sharing captured data as images may result in a large amount of data traffic.

Another approach to capturing a screen that is currently displayed on a TV browser is to push a User Interface (UI) or application for controlling the browser on a TV side to a smartphone. However, in this case, remote UIs provided to control heterogeneous devices with different control structures are most likely not suited to each other and require a separate stacks.

SUMMARY OF THE INVENTION

The present invention has been made to address at least the above problems and/or disadvantages and to provide at least the advantages described below. Accordingly, an aspect of the present invention provides a method and apparatus for converting content adapted to detect a browsing context from content current being browsed upon the request of a user and to convert content based on the browsing content.

According to one aspect of the present invention, a method is provided for converting content. A predetermined request signal is received from an external device. All or a portion of currently browsed content is converted into data that can be browsed on the external device, based on information about the external device contained in the predetermined request signal. The data is transmitted to the external device.

According to another aspect of the present invention, a method is provided for converting content. A predetermined request signal is received from an external device via a port to which information about the external device is assigned. All or a portion of currently browsed content is converted into data that can be browsed on the external device, based on information about the external device. The data is transmitted to the external device via the port.

According to an additional aspect of the present invention, an apparatus is provided for converting content. The apparatus includes a receiver for receiving a predetermined request signal from an external device. The apparatus also includes a controller for converting all or a portion of currently browsed content into data that can be browsed on the external device, based on information about the external device contained in the predetermined request signal. The apparatus further includes a transmitter for sending the data to the external device.

According to a further aspect of the present invention, an apparatus is provided for converting content. The apparatus includes a port to which information about an external device is assigned. The apparatus also includes a receiver for receiving a predetermined request signal from an external device via the port. The apparatus additionally includes a controller for converting all or a portion of currently browsed content into data that can be browsed on the external device, based on information about the external device. The apparatus further includes a transmitter for sending the resulting data to the external device via the port.

According to another aspect of the present invention, a computer readable recording medium is provided on which a program for implementing a method for converting content is recorded. The method includes: receiving a predetermined request signal from an external device; converting all or a portion of currently browsed content into data that can be browsed on the external device, based on information about the external device contained in the predetermined request signal; and transmitting the data to the external device.

Additionally, according to another aspect of the present invention, a computer readable recording medium is provided on which a program for implementing a method for converting content is recorded. The method includes: receiving a predetermined request signal from an external device via a port to which information about the external device is assigned; converting all or a portion of currently browsed content into data that can be browsed on the external device, based on information about the external device; and transmitting the data to the external device.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF EMBODIMENTS OF THE PRESENT INVENTION

Figure 1:
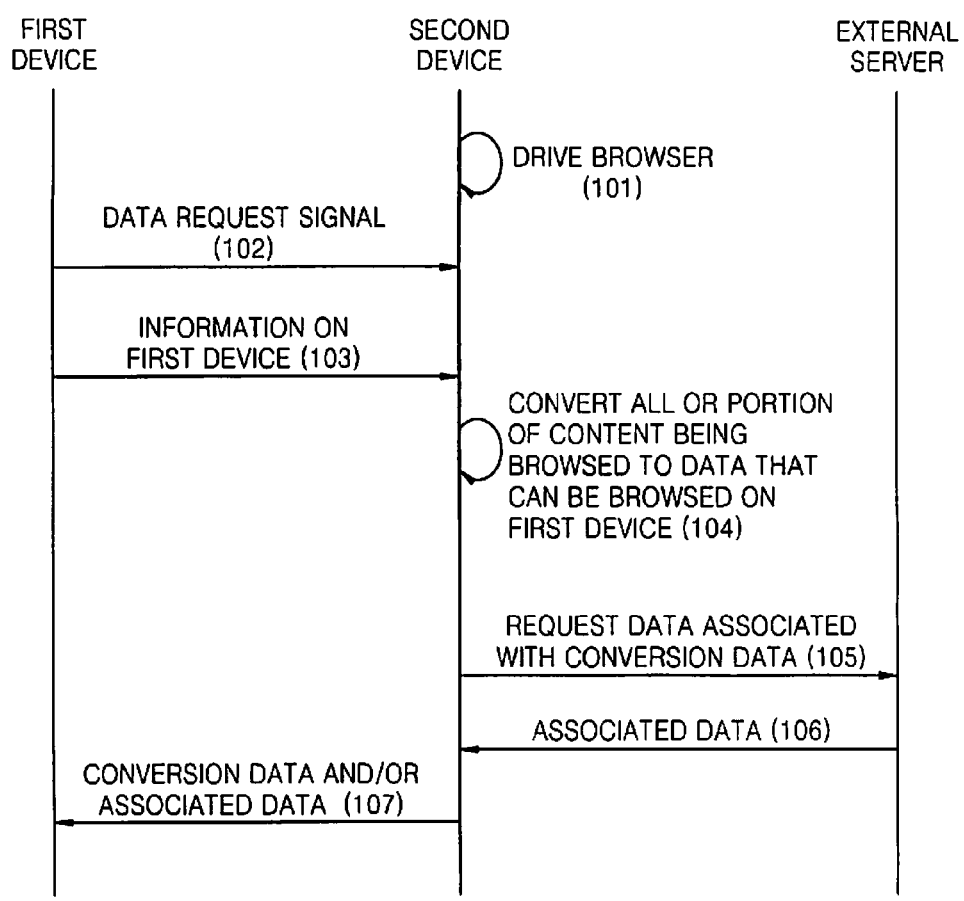
FIG. 1 is a flowchart illustrating a method for converting content, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

FIG. 1 is a flowchart of a method for converting content, according to an embodiment of the present invention.

Referring to FIG. 1, a second device drives a browser in step 101. In general, the browser is an application program that allows a user to view all information on a World Wide Web (WWW). Specifically, the browser enables the user to view all information of a web server on the Internet and to search for hypertext documents. General functions of the a browser include at least opening web pages, providing a list of recently visited Internet addresses (Uniform Resource Locator: URL), memorizing and managing frequently visited URL's, storing and printing web pages, supporting programs for using e-mail & news groups, and editing Hyper Text Marker Language (HTML) documents. In the present embodiment, browsing includes at least moving to resources linked by hyperlinks, entering search key words, reading an e-mail message in an e-mail account, and viewing maps. A browser engine for driving a browser interprets and renders markup-based content. A browser engine on a second device may be the same as or different from a browser engine on a first device connected to the second device via a predetermined communication network. In one embodiment of the present invention, the browser may be an application that is run in an Internet environment as well as a general application that is run on first and second devices.

In step 102, the first device sends a data request signal to a second device. If a user of the first device wishes to acquire information related to content being browsed on the second device, the first device then transmits the data request signal to the second device. For example, in order to capture content being browsed on the second device, the user of the first device may select a recording function button or photo-taking function button in the first device and sends a capture signal to the second device.

In step 103, the first device also sends information about the first device to the second device with the data request signal. Upon receipt of requested data from the second device, the first device sends information on the specification of the first device to the second device in order to run or play back the data on the first device. For example, if the first device has a browser that allows the user to access the Internet, information specifying that the first device has the browser may be sent to the second device. If the first device is a MP3 player, information specifying the first device can play back an audio source may be sent to the second device.

In step 104, the second device converts all or a portion of its currently browsed content into data that can be browsed on the first device based on the information about the first device, so that the content can be driven by the browser engine on the first device. Specifically, the second device detects a browsing context from its currently browsed content and converts all or a portion of the browsed content to data that can be browsed on the first device according to the browsing context.

Context refers to information that defines characteristics of the situation of entities, such as a person, place, object, and time that are considered to affect the interaction between users, systems, or device applications. A browsing context is a collection of one or more documents object and one or more views. In one embodiment, the second device may provide a Document Object Model (hereinafter referred to as "DOM") access interface in order to obtain current context information. A DOM is an object-based document model for interconnecting eXtensible Markup Language (XML) documents through a web browser. A DOM access interface is a platform- and language-neutral interface that allows programs or scripts to dynamically access and update content, structure, and style of documents. The document already processed and viewed by a user can be further modified and the results of the modification can be incorporated back into the document for display. In one embodiment of the present invention, detecting the browsing context means detecting appropriate document objects or views from the currently browsed content so that the content can be driven on the first device. For example, the browsing context that can be detected by a browser of the second device may include details entered by the user until currently browsing the content, accessed internet pages or all text information contained therein, keywords extracted from the text information using a font size or title, a hyperlink currently being brought to user's attention, which is generally indicated by 'Focus' and, title, address, and content in a specific region of a screen currently being viewed by a user or sender of an email.

After detecting the browsing context, the second device extracts all or a portion of the currently browsed content based on the browsing context and converts the extracted content to data that can be appropriately driven on the first device. For example, an Internet browser may be run on the second device. Furthermore, the resulting data may be a URL of a page currently being browsed or the text of an email. If the first device plays back only an image, the resulting data may be an image file or thumbnail.

In step 105, the second device requests data associated with the resulting data as supplementary data from an external server connected thereto via a predetermined communication network such as the Internet. The second device may use the characteristics of its browser to provide extended information through open-Application Programming Interface (API) of Google or Yahoo. For example, if the text of an email does not contain a map nor telephone number of a wedding chapel except for its name, the second device may use Open-API to acquire the map of the wedding chapel through Google or Yahoo. In this case, the second device may make its own determination or receive a request for the data from the first device to request the data from the external server.

In step 106, the second device receives the associated data from the external server.

In this case, the second device may convert the received data to a format that is the same as or different from the resulting data. The operations 105 and 106 may be optionally omitted.

In step 107, the second device sends the resulting data alone or together with the associated data.

The method for converting content according to this embodiment of the present invention allows for easy capture of information being browsed on another device using an interface that is familiar to a user of each device, thereby increasing user convenience while allowing efficient sharing of data.

Figure 2:
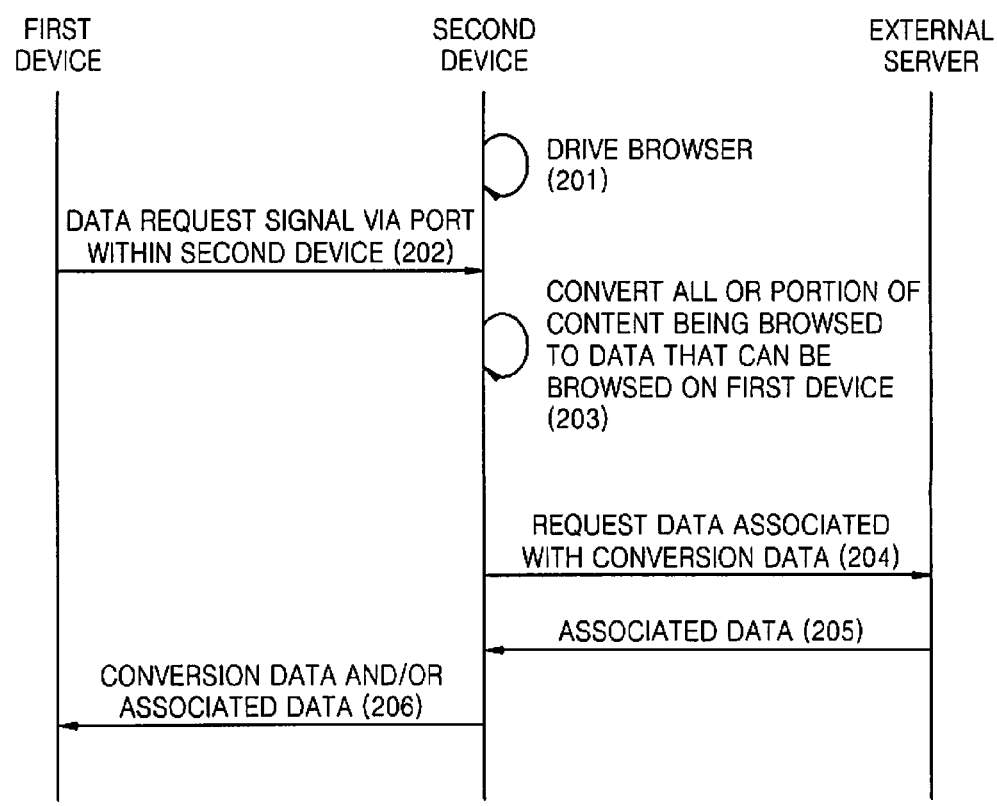
FIG. 2 is a flowchart illustrating a method of converting content, according to another embodiment of the present invention.

FIG. 2 is a flowchart illustrating a method of converting content, according to another embodiment of the present invention.

Referring to FIG. 2, in step 201, a second device drives a browser. Step 201 is performed in the same way as step 101, and a detailed description is provided above with respect to FIG. 1.

In step 202, a first device sends a data request signal to the second device. If a user of the first device wishes to acquire information related to content being browsed on the second device, the first device then transmits a data request signal to the second device. Step 202 differs from step 102 of FIG. 1 in that the first device sends the data request signal to the second device via a port contained in the second device.

Information about the first device is assigned to at least one port within the second device. For example, assuming that the content being browsed on the second device is mail, the second device may include a port for providing keywords such as place and time contained in a mail message, a port for providing the entire thumbnail of the mail, a port for providing the mail or images attached to the mail message, a port for providing data related to multimedia such as background music embedded in the mail message, and a port for providing only audio data. Being aware of a data type that it can handle, the first device is able to request appropriate data via a predefined port. For example, if the first device is an MP3 player with a display, it may request data from a port for providing a thumbnail, a port for providing images, and a port for providing audio data. In the embodiment of the present invention described with reference to FIG. 2, the port may be a Transmission Control Protocol/Internet Protocol (TCP/IP). A TCP/IP port currently available has software-based port numbers ranging from 0 to 65,535 for all kinds of services such as e-mail, WWW, and File Transfer Protocol (FTP) being executed by each device communicating via the Internet. Ports, numbered 0 to 1,023, are separately assigned to specific services by Internet Assigned Number Authority (IANA). Thus, in this embodiment of the present invention, the TCP/IP port may have port numbers in the range of 1,024 to 65,535.

In step 203, after checking a port to which a data request is made, the second device converts all or a portion of its currently browsed content into data that can be browsed on the first device, based on information assigned to the port. More specifically, the second device detects a browsing context from its currently browsed content and converts all or a portion of the browsed content to data that can be browsed on the first device according to the browsing context. For example, if the first device requests data from a port for providing audio data, the second device extracts audio data from the currently browsed content. If the browsed content does not contain the audio data, the second device may convert a text in the content into audio. If the text cannot be converted into audio, an exception may occur in which there is no answer. In this case, the first device is able to handle this situation. Upon receipt of a data request from the first device via a plurality of ports, the second device converts all or a portion of its currently browsed content to data corresponding to each port and transmits the resulting data to the first device via the port.

Steps 204 through 206 are performed in the same way as steps 105 through 107, and are described in detail with reference to FIG. 1.

The method for converting content according to this embodiment of the present invention allows for processing of data for each port to which a data request is made from the first device without the need for the second device to prepare the data, thereby reducing a load in the second device and simplifying the implementation of the entire system.

Figure 3:
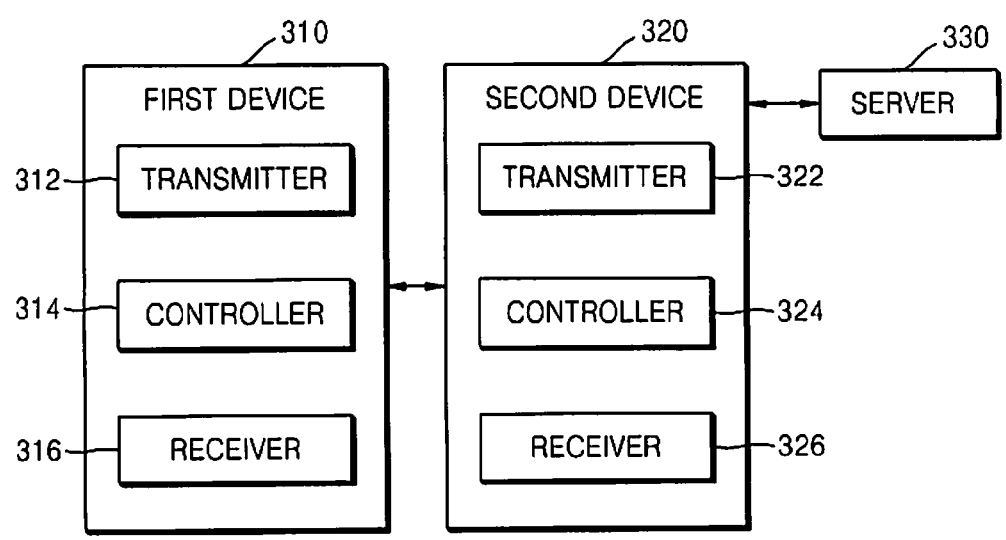
FIG. 3 is a block diagram of an apparatus for converting content, according to an embodiment of the present invention.

FIG. 3 is a block diagram of an apparatus for converting content, according to an embodiment of the present invention.

Referring to FIG. 3, a first device 310 includes a transmitter 312, a controller 314, and a receiver 316. A second device 320 includes a transmitter 322, a controller 324, and a receiver 326.

The first and second devices 310 and 320 are connected to each other via a wireless/wired communication network such as Wi-Fi, Bluetooth, or Zigbee. The second device 320 is also connected to an external server 330 via a wired/wireless communication network such as the Internet.

The second device is a device on which a browser is running. The first device 310 requests details of currently browsed content from the second device 320. For example, the second device 320 may be a TV on which an Internet browser is running The first device 310 may be a smartphone that requests a capture of details being browsed on the TV The transmitter 312 of the first device 310 sends a data request signal to the second device 320. For example, if a user of the first device 310 wishes to acquire information related to content being browsed on the second device 320, the transmitter 312 of the first device 310 then transmits a data request signal to the second device 320.

The transmitter 312 of the first device 310 also sends information about the first device 310 to the second device 320 with the data request signal. Upon receipt of requested data from the second device 320, the first device 310 sends information on the specification of the first device 310 to the second device 320 in order to run or play back the data on the first device 310.

The controller 314 of the first device 310 determines the properties of the first device 310 and creates information about the specification of the first device 310. The controller 314 controls the overall operations of the first device 310 by managing data received by the receiver 316 and running a browser engine on the first device 310 stored in a storage of the first device 310. The browser engine on the first device 310 may be the same as or different from a browser engine on the second device 320 connected to the first device 310 via a predetermined communication network.

In another embodiment, the transmitter 312 of the first device 310 may send a data request signal to the second device 320 via a port within the second device 320.

Information about the first device 310 is assigned to at least one port within the second device 320. For example, assuming that the content being browsed on the second device 320 is mail, the second device 320 may include a port for providing keywords such as place and time contained in a mail message, a port for providing the entire thumbnail of the mail, a port for providing the mail or images attached to the mail message, a port for providing data related to multimedia such as background music embedded in the mail message, and a port for providing only audio data. The controller 314 of the first device 310 that is aware of a data type that it can handle controls the transmitter 312 to request appropriate data via a predefined port. For example, if the first device 310 is an MP3 player with a display, the controller 314 may request data from a port for providing a thumbnail, a port for providing images, and a port for providing audio data. In an embodiment of the present invention, the port may be a TCP/IP. A TCP/IP port currently available has software-based port numbers ranging from 0 to 65,535 for all kinds of services such as e-mail, WWW, and FTP being executed by each device communicating via the Internet. Since ports numbered 0 to 1,023 are generally assigned to specific services, the TCP/IP port may have port numbers in the range of 1,024 to 65,535.

The controller 324 of the second device 320 drives a browser. In general, the browser is an application program that allows a user to view all information on the WWW. In an embodiment of the present invention, browsing includes moving to resources linked by hyperlinks, entering search key words, reading an e-mail message in an e-mail account, and viewing maps. The browser engine on the second device 320 for driving the browser interprets and renders markup-based content. In one embodiment of the present invention, the browser may be an application that is run in an Internet environment as well as a general application that is run on first and second devices 310 and 320. The browser engine on the second device 320 is stored in a storage of the second device 320 and controlled by the controller 324 of the second device 320.

The receiver 326 of the second device 320 receives a data request signal from the first device 310. The controller 324 of the second device 320 converts all or a portion of currently browsed content into data that can be browsed on the first device 310 based on the information about the first device 310, so that the content can be driven by the browser engine on the first device 310. More specifically, the controller 324 detects a browsing context from the currently browsed content and converts all or a portion of the browsed content to data that can be browsed on the first device 310 according to the browsing context.

In one embodiment of the present invention, the controller 324 of the second device 320 may provide a DOM access interface in order to obtain current context information. In order to detect the browsing context, the controller 324 detects appropriate document objects or views from the currently browsed content so that the content can be driven on the first device 310. For example, the browsing context that can be detected by the browser of the second device 320 may include details entered by the user until currently browsing the content, accessed internet pages or all text information contained therein, keywords extracted from the text information using a font size or title, a hyperlink currently being brought to user's attention, which is generally indicated by 'Focus' and, title, address, and content in a specific region of a screen currently being viewed by a user or sender of an email.

After detecting the browsing context, the controller 324 extracts all or a portion of the currently browsed content according to the browsing context and converts the extracted content to data that can be appropriately driven on the first device 310. For example, an Internet browser may be run on the second device 320. Furthermore, the resulting data may be a URL of a page currently being browsed or the text of an email. If the first device 310 plays back only an image, the resulting data may be an image file or thumbnail.

The controller 324 requests data associated with the resulting data as supplementary data from the external server 330 connected to the second device 320 via a predetermined communication network such as the Internet. For example, the controller 324 may use the characteristics of the browser to provide extended information through open-API of Google or Yahoo.

The receiver 326 of the second device 320 receives the associated data from the external server 330. In this case, the controller 324 may convert the received data to a format that is the same as or different from the resulting data. Requesting the associated data from the external server 330 may be optionally omitted.

The transmitter 322 of the second device 320 may send the conversion data alone to the first device 310 or together with the associated data.

In another embodiment of the present invention, when the first device 310 makes a data request via a predetermined port within the second device 320, the controller 324 checks a port to which such a data request is made. The controller 324 then converts all or a portion of currently browsed content into data that can be browsed on the first device 310, based on information assigned to the port. More specifically, the controller 324 detects a browsing context from the currently browsed content and converts all or a portion of the browsed content to data that can be browsed on the first device 310 according to the browsing context. For example, if the first device 310 requests data from a port for providing audio data, the controller 324 extracts audio data from the currently browsed content. If the browsed content does not contain the audio data, the controller 324 may convert a text in the content to audio. If the text cannot be converted to audio, an exception may occur in which there is no answer. In this case, the first device 310 is able to handle this situation. Upon receipt of a data request from the first device 310 via a plurality of ports, the controller 324 converts all or a portion of the currently browsed content to data corresponding to each port and transmits the resulting data to the first device 310 via the port.

The methods for converting content according to the embodiments of the present invention as described above may be embodied as computer-readable codes on a computer readable recording medium. The computer readable recording medium may be any data storage device that can store data that can be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the embodiments of the present invention can be construed by programmers of ordinary skill in the art to which the present invention pertains.

While the present invention has been shown and described with reference to certain embodiments thereof, it will be understood by those of ordinary skill in the art that various changes in form and detail may be made therein without departing from the spirit and scope of the present invention as defined by the following claims. It should be understood that the embodiments described therein should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method for converting a content at a device, the method comprising the steps of:
   receiving a predetermined request signal from an external device;
   detecting a browsing context from a content currently browsed at the device, based on information about the external device contained in the predetermined request signal;
   converting the currently browsed content into captured data that can be browsed on the external device according to the detected browsing context, based on a characteristic of the external device; and
   transmitting the captured data to the external device,
   wherein the browsing context is a collection of at least one document object related to the content.

2. A method for converting a content, comprising the steps of:
   receiving a predetermined request signal from an external device via a plurality of ports to each of which information about the external device is assigned;
   detecting a browsing context from currently browsed content based on the information about the external device;
   converting the currently browsed content into data that can be browsed on the external device according to the detected browsing context and according to a respective content type assigned to each of the plurality of ports; and
   transmitting the data to the external device via the plurality of ports,
   wherein the browsing context is a collection of at least one document object related to the content.

3. The method of claim 2, wherein the plurality of ports are Transmission Control Protocol/Internet Protocol (TCP/IP) ports.

4. The method of claim 2, further comprising:
   requesting data associated with the data obtained by the conversion from an external server via a predetermined communication network;
   receiving the associated data; and
   transmitting at least one of the data obtained by the conversion and the associated data to the external device.

5. An apparatus for converting a content at a device, the apparatus comprising:
- a receiver that receives a predetermined request signal from an external device;
- a controller that detects a browsing context from a content currently browsed at the device based on information about the external device contained in the predetermined request signal and converts of the currently browsed content into captured data that can be browsed on the external device according to the detected browsing context, based on a characteristic of the external device; and
- a transmitter that sends the captured data to the external device,
- wherein the browsing context is a collection of at least one document object related to the content.

6. An apparatus for converting a content, the apparatus comprising:
- a plurality of ports to each of which information about an external device is assigned;
- a receiver that receives a predetermined request signal from an external device via the port;
- a controller that detects a browsing context from currently browsed content based on information about the external device and converts the currently browsed content into data that can be browsed on the external device according to the detected browsing context and according to a respective content type assigned to each of the plurality of ports; and
- a transmitter that sends the resulting data to the external device via the plurality of ports,
- wherein the browsing context is a collection of at least one document object related to the content.

7. The apparatus of claim 6, wherein the port is a Transmission Control Protocol/Internet Protocol (TCP/IP).

8. The apparatus of claim 6, wherein the controller controls the transmitter to request data associated with the data obtained by the conversion from an external server and upon receipt of the associated data through the receiver, selects at least one of the data obtained by the conversion and the associated data, and wherein the transmitter sends the selected data to the external device.

9. A non-transitory computer readable recording medium on which a program for implementing a method for converting a content at a device is recorded, the method comprising the steps of:
- receiving a predetermined request signal from an external device;
- detecting a browsing context from a content currently browsed at the device, based on information about the external device contained in the predetermined request signal;
- converting the currently browsed content into captured data that can be browsed on the external device according to the detected browsing context, based on a characteristic of the external device; and
- transmitting the captured data to the external device,
- wherein the browsing context is a collection of at least one document object related to the content.

10. A non-transitory computer readable recording medium on which a program for implementing a method for converting a content is recorded, the method comprising the steps of:
- receiving a predetermined request signal from an external device via a plurality of ports to each of which information about the external device is assigned;
- detecting a browsing context from currently browsed content based on the information about the external device;
- converting the currently browsed content into data that can be browsed on the external device according to the detected browsing context and according to a respective content type assigned to each of the plurality of ports; and
- transmitting the data to the external device via the plurality of ports,
- wherein the browsing context is a collection of at least one document object related to the content.

* * * * *